United States Patent
Ludois et al.

(10) Patent No.: US 10,381,897 B2
(45) Date of Patent: Aug. 13, 2019

(54) BUS BAR WITH INTEGRATED VOLTAGE RISE TIME FILTER

(71) Applicant: Wisconsin Alumni Research Foundation, Madison, WI (US)

(72) Inventors: Daniel Colin Ludois, Madison, WI (US); Andy Lee Schroedermeier, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 31 days.

(21) Appl. No.: 15/658,989

(22) Filed: Jul. 25, 2017

(65) Prior Publication Data

US 2019/0036414 A1    Jan. 31, 2019

(51) Int. Cl.
| | |
|---|---|
| *H02K 5/22* | (2006.01) |
| *H01B 7/00* | (2006.01) |
| *H01B 7/02* | (2006.01) |
| *H01B 1/02* | (2006.01) |
| *H01B 7/04* | (2006.01) |
| *H01B 7/18* | (2006.01) |
| *H01B 7/29* | (2006.01) |
| *H01P 1/218* | (2006.01) |
| *H02P 27/04* | (2016.01) |
| *H01B 7/17* | (2006.01) |

(52) U.S. Cl.
CPC ............... *H02K 5/225* (2013.01); *H01B 1/02* (2013.01); *H01B 7/0009* (2013.01); *H01B 7/0018* (2013.01); *H01B 7/02* (2013.01); *H01B 7/04* (2013.01); *H01B 7/18* (2013.01); *H01B 7/292* (2013.01); *H01P 1/218* (2013.01); *H02P 27/04* (2013.01); *H01B 7/17* (2013.01)

(58) Field of Classification Search
CPC ....... H02K 5/225; H01B 11/1895; H01B 7/17
USPC ............................................ 318/504; 333/12
See application file for complete search history.

(56) References Cited

U.S. PATENT DOCUMENTS

| | | | | |
|---|---|---|---|---|
| 4,104,600 A | * | 8/1978 | Mayer ................ | H01B 11/1895 333/12 |
| 4,357,750 A | * | 11/1982 | Ostman .................... | H01B 7/08 174/117 F |
| 4,417,093 A | * | 11/1983 | Occhini .................... | H01B 3/20 174/102 SC |
| 4,837,659 A | | 6/1989 | Roshen et al. | |
| 4,922,156 A | | 5/1990 | Turcotte et al. | |
| 5,068,497 A | * | 11/1991 | Krieger ................ | H01B 7/0054 174/106 R |
| 5,274,346 A | | 12/1993 | Izu et al. | |
| 5,838,214 A | | 11/1998 | Goel et al. | |
| 6,469,596 B2 | | 10/2002 | Hull et al. | |
| 6,985,064 B1 | | 1/2006 | Loukas | |

(Continued)

FOREIGN PATENT DOCUMENTS

| | | |
|---|---|---|
| EP | 1677419 A1 | 5/2006 |
| JP | 2003174347 A | 6/2003 |

*Primary Examiner* — Eduardo Colon Santana
*Assistant Examiner* — Zemenay T Truneh
(74) *Attorney, Agent, or Firm* — Boyle Fredrickson, S.C.

(57) ABSTRACT

A bus bar or similar high current conductor may be sheathed in a high relative permeability material formed in layers to both increase the inductance of that conductor and to provide a capacitance and resistance useful for forming a low pass filter to reduce the rise time of the voltage signals on the bus bar such as can be damaging to motor insulation and the like.

20 Claims, 3 Drawing Sheets

(56) References Cited

U.S. PATENT DOCUMENTS

| | | | |
|---|---|---|---|
| 7,006,366 B2* | 2/2006 | Panda | H02M 1/4216 |
| | | | 363/70 |
| 7,436,281 B2 | 10/2008 | Brennan et al. | |
| 7,492,240 B1 | 2/2009 | Cho et al. | |
| 9,349,505 B2* | 5/2016 | Tozawa | H01B 7/17 |
| 9,424,984 B2 | 8/2016 | Ludois | |
| 2003/0111256 A1* | 6/2003 | Fujiwara | H01B 1/023 |
| | | | 174/128.1 |
| 2006/0139971 A1 | 6/2006 | Suzuki | |
| 2008/0094860 A1 | 4/2008 | Falk | |
| 2012/0038434 A1 | 2/2012 | Harrison | |
| 2015/0255209 A1* | 9/2015 | Ludois | H01F 27/40 |
| | | | 361/270 |
| 2016/0141079 A1* | 5/2016 | Radovinsky | H01B 12/02 |
| | | | 505/230 |

\* cited by examiner

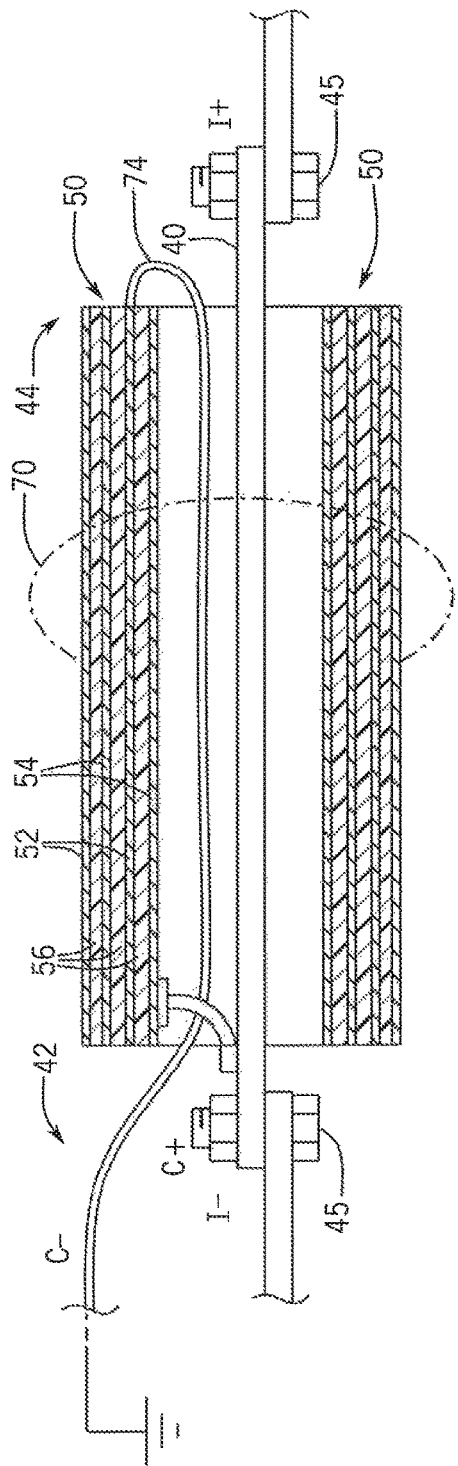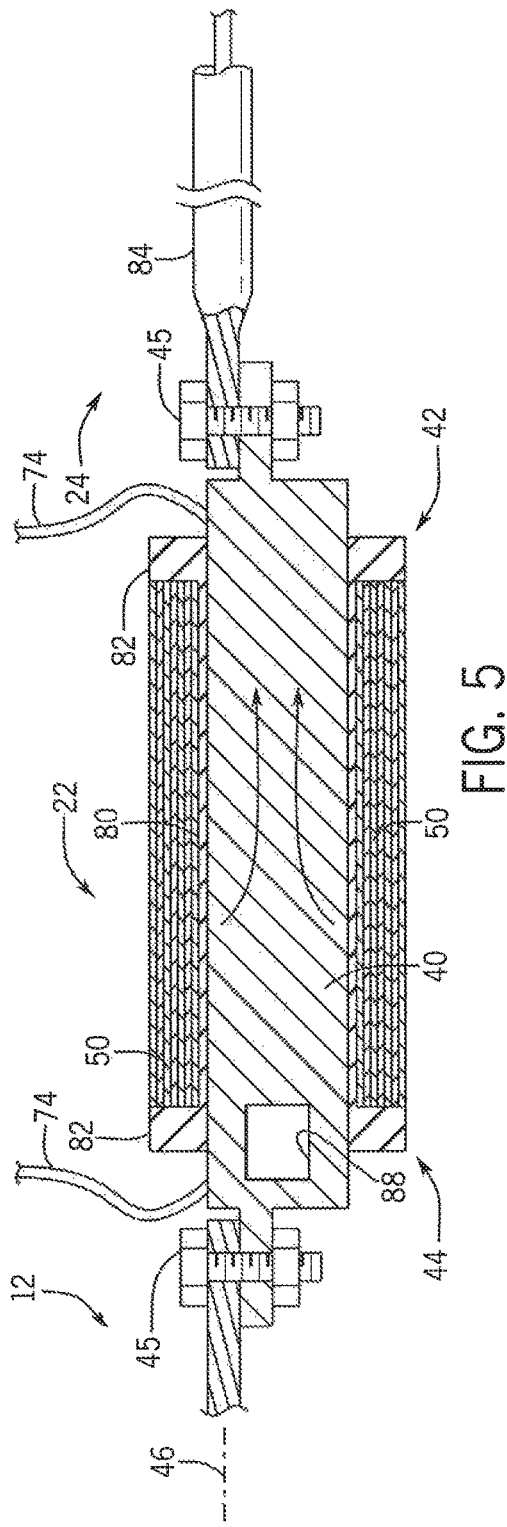

BUS BAR WITH INTEGRATED VOLTAGE RISE TIME FILTER

STATEMENT REGARDING FEDERALLY SPONSORED RESEARCH OR DEVELOPMENT

--

CROSS REFERENCE TO RELATED APPLICATION

--

BACKGROUND OF THE INVENTION

The present invention relates to bus bars and similar high amperage conductors used in electrical circuits and in particular to a bus bar incorporating a filter against rapid voltage fluctuations.

High-power electrical equipment such as electrical motors are increasingly powered using alternating current synthesized using semiconductor devices. Such synthesized power improves the efficiency of motor operation, for example, by allowing frequency and voltage supplied to the motor to be tailored to dynamic changes in the motor's operating mode.

Desirably, the semiconductors used for power synthesis are operated in a switched mode, switching rapidly between an on-state and off-state to reduce power dissipation in the semiconductor device. Modern semiconductor devices, such as those employing silicon carbide or gallium nitride, can provide extremely rapid switch rates in the nanosecond range.

The alternating current power generated by switched semiconductors may have substantial high-frequency components caused by the rapid switching. These high-frequency components, often expressed in a rate of change of the voltage applied to the motor (dV/dT) and often termed "voltage rise time," can damage motor insulation causing premature insulation breakdown and can induce current flow through bearing surfaces causing pitting and early bearing failure. High rise times can propagate standing waves down long motor cables as well, amplifying voltages at the motor terminals beyond their ratings.

For these reasons, standards have been developed, for example, NEMA MG1 Part 31 and Part 30, which limit the acceptable voltage rise time and peak voltages applied to certain motors. For example, these standards may limit the peak voltage applied to the motor to be equal to 3.1 times the rating of the motor voltage and the voltage rise time of the voltage applied to the motor to be greater than or equal to 0.1 microseconds, where rise time is measured between 10 percent and 90 percent of peak voltage.

These requirements often require the introduction of additional filter components positioned between the motor drive (synthesizing power for the motor) and the motor. In cases where a motor drive has been upgraded, the process of adding additional filter components may be difficult, requiring additional spacing in cabinets which were wired without contemplation of the need for filter modules.

SUMMARY OF THE INVENTION

The present invention provides a bus bar or similar conductor incorporating voltage rise time filtration. The filter makes use of the inductance of the bus bar as is augmented by a surrounding layer of high relative permeability material. This high relative permeability material also provides multiple layers that provide a necessary filter capacitance and damping resistance. The result is a compact form factor bus bar that also provides high-frequency filtering.

Specifically, then, the present invention provides a bus conductor having a low resistance conductor extending along a length between a first and second end. A wrapping of alternate layers of a first and second layer of conductive material is provided in a spiral around the length of the low resistance conductor so as to expose the first and second ends of the low resistance conductor for connection thereto, where the first and second layer of conductive material are separated from each other by insulating material. The first layer of conductive material is electrically attached to a first end of the low resistance conductor and the second layer of conductive material is electrically attached to a ground lead adapted to be connected to a ground or neutral point.

It is thus a feature of at least one embodiment of the invention to provide an extremely compact voltage rise time filter in the form factor of a bus bar or bus cable. In this regard, the energy storage volume of the capacitor may overlap energy storage volume of the inductor and the volume of the resistor, conserving space.

The bus conductor may provide a low pass electrical filter operating to receive at the second end a voltage stepping from zero to a peak value and limiting a corresponding rise time at the first end to greater than 0.1 microseconds. Characterized in another way, the low pass filter may provide a corner frequency of greater than 50 kilohertz.

It is thus a feature of at least one embodiment of the invention to provide a voltage rise filter suitable for use with current voltage rise rate standards.

The low resistance conductor may attach to the second layer of conductive material proximate to a second end of the low resistance conductor and then may pass within the wrapping to position proximate to the first end of the low resistance conductor.

It is thus a feature of at least one embodiment of the invention to provide a path of a lead of the effective capacitor formed by the invention that loops back within the wrapping to reduce or eliminate series inductance with the capacitance.

The low resistance conductor may be a bar having a constant area cross-section form of a metal selected from the group consisting of copper and aluminum. Alternatively, the low resistance conductor may be a multi-stranded cable rated for currents in excess of ten amperes.

It is thus a feature of at least one embodiment of the invention to provide a bus conductor suitable for high current levels with low resistance.

The first and second conductive layers may have a relative permeability of greater than 2

It is thus a feature of at least one embodiment of the invention to boost self-inductance of the bus bar as a filter component.

The first and second conductive layers may be a ferromagnetic foil. Alternatively, the first and second layers may be of a combination of a conductive material and a high relative permeability material.

It is thus a feature of at least one embodiment of the invention to provide a material that is conductive, enhances the inductance of the bus bar conductor, and provides resistance for damping of voltage overshoots.

The bus conductor may further include a marking distinguishing the first end from the second end so that the first end may be positioned to be proximate to a motor and the second end proximate to a power supply.

It is thus a feature of at least one embodiment of the invention to provide a bus bar replacement that simplifies installation.

The ground lead may be an insulated flexible wire that includes a terminating releasable connection to a ground point.

It is thus a feature of at least one embodiment of the invention to permit flexible connection of the ground connection through the use of a low amperage flexible conductor.

The first and second ends may include attachment holes passing therethrough.

It is thus a feature of at least one embodiment of the invention to provide a filter that is compatible with a variety of bus bar designs.

The bus conductor may further include a protective cylindrical shroud fitting around the wrappings of an insulating material different from the insulating dielectric.

It is thus a feature of at least one embodiment of the invention to provide a damage resistant surface for the protection of the wrapping.

These particular objects and advantages may apply to only some embodiments falling within the claims and thus do not define the scope of the invention.

BRIEF DESCRIPTION OF THE DRAWINGS

FIG. 4 is an exaggerated cross-section along line 4-4 of FIG. 2 showing electrical connection of the capacitor element of the wrapping to the central conductor and ground strap;

FIG. 5 is a cross-sectional view similar to FIG. 4 showing a cylindrical central conductor having asymmetric thermal conduction properties for conducting heat away from the wrapped layers and away from the solid-state power supply.

DETAILED DESCRIPTION OF THE PREFERRED EMBODIMENT

Figure 1:
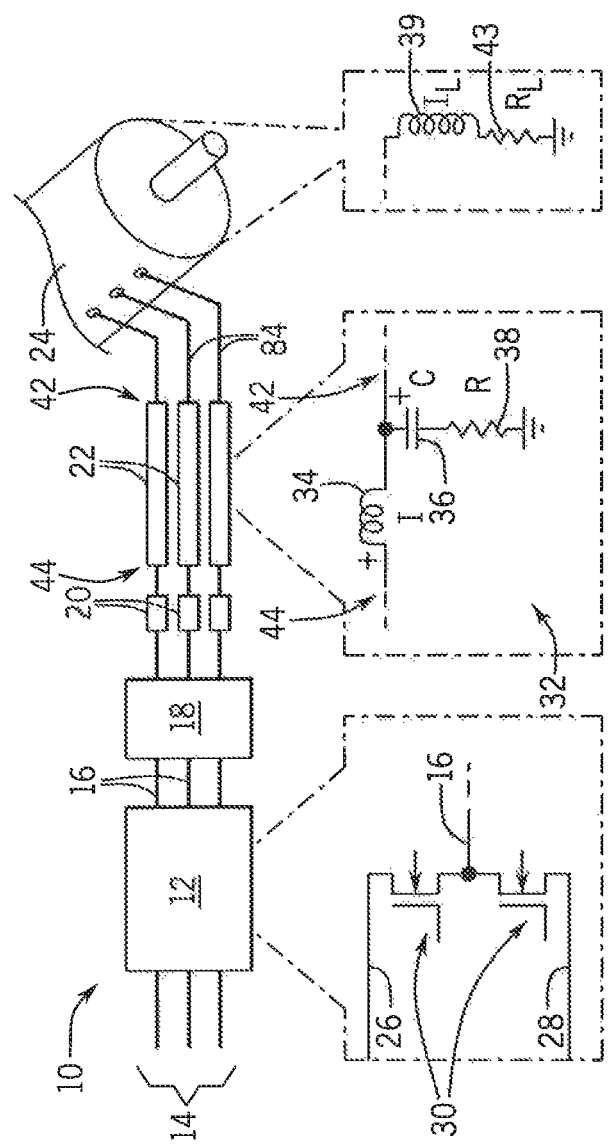
FIG. 1 is a simplified block diagram of a typical motor control system showing a solid-state power supply communicating with the motor through a bus bar set and showing the electrical equivalents of these elements.

Referring now to FIG. 1, an instructive application of the invention may provide for a motor drive system 10 having a solid-state power supply 12, for example, the latter receiving three-phase input power 14 and outputting three phases of synthesized alternating current (AC) electrical power 16. The three phases of synthesized power may be controlled by a contactor or disconnect 18 and then may pass through corresponding fuses 20 and then a set of bus bar filters 22 (one for each phase) to the motor 24.

The solid-state power supply 12 may make use of switching semiconductors 30 (a simplified output stage of only single phase is shown) to switch power between a positive direct current (DC) rail 26 and negative DC rail 28. The rails 26 and 28 are spanned by a series connection of the high-speed semiconductors 30 which may be alternately activated to create a rapid switch square wave of electrical power 16. The semiconductors 30 may be, for example, silicon carbide semiconductors that can produce rise times less than 10 nanoseconds, or other similar semiconductor devices that may produce rise times of less than 0.1 microseconds. As used herein, rise time shall mean time it takes a voltage waveform to pass between 10 percent and 90 percent of its peak value.

According to the present invention, each bus bar filter 22 operates as a low pass filter 32 providing a series inductance 34 carrying current from the power supply 12 to the motor 24. This inductance 34 may be shunted to ground at the end closest to the motor 24 by means of a capacitance 36 in series with a resistance 38. The motor 24 is shown modeled as a series connected inductance 39 and resistance 43.

Figure 2:
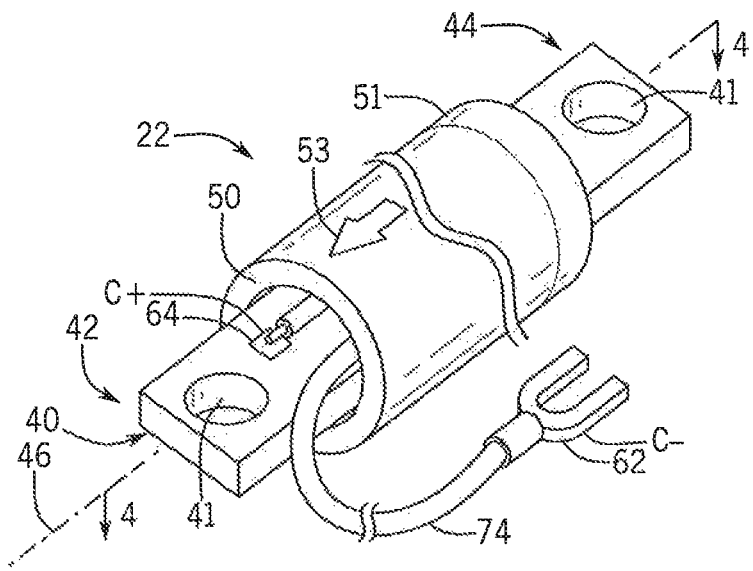
FIG. 2 is a fragmentary perspective view of one embodiment of a bus bar suitable for the motor system of FIG. 1 showing a central conductor with a rectangular cross-section surrounded by wrapped layers of conductive high relative permeability material boosting the inductance of the central conductor and providing a capacitance that may be grounded using a grounding strap.

Referring now to FIG. 2, in one embodiment, the bus bar filter 22 of FIG. 1 may assume a conventional form to provide a central conductor 40 formed of a conductive metal bar functioning as a primary conductor between the power supply 12 and the motor 24. The central conductor 40 will generally have a uniform cross-section for example rectangular or circular. The central conductor 40 extends typically but not necessarily in a straight line from a first end 42 to a second end 44. Typically, the metal of the central conductor will be copper or aluminum and will be rated at more than one ampere and preferably more than 10 amperes or even 100 amperes of current. Each of the first end 42 and second end 44 may have holes 41 drilled or formed there through for attachment of the bus bar filter 22 to other components, for example, by bolts 45 (shown in FIG. 4) passing through the holes 41 of the first end 42 and second end 44.

Surrounding the central conductor 40, and encircling an axis 46 extending along the length from the first end 42 to the second end 44, is a set of conductive high relative permeability wrappings 50. The wrappings 50 may be shorter (along axis 46) than the central conductor 40 to allow the first end 42 and second end 44 to extend therefrom for electrical attachment to the motor 24 and fuses 20 shown in FIG. 1. The wrappings 50 may be surrounded by a protective sheath 51, for example, of a different polymer material than used in the wrappings 50 (as will be discussed below) to provide protection from abrasion or damage to the wrappings 50. An indication 53 may be embossed or printed on the outside of the sheath 51 indicating a direction of the motor 24 (or power supply) with respect to the bus bar filter 22 to ensure proper installation.

Figure 3:
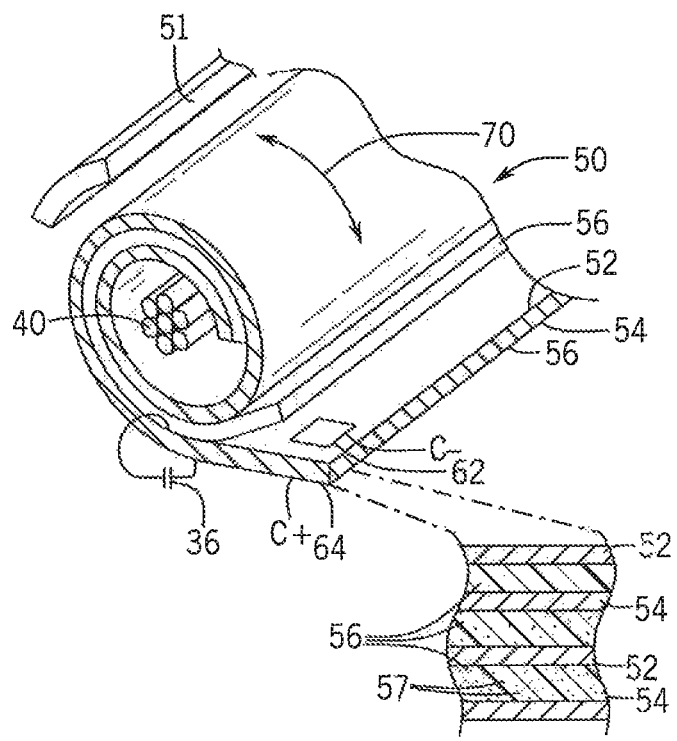
FIG. 3 is a simplified diagram of the wrapped layers of FIG. 2 showing attachment of capacitor leads and showing an alternative central conductor in the form of a multistranded cable.

Referring also to FIG. 3, the wrappings 50 provide a spiral winding of a first and second conductive layer 52 and 54 separated by insulating dielectric layers 56 and encircling the central conductor (in FIG. 3 shown as a multi-stranded copper cable). The first conductive layer 52 and second conductive layer 54 as separated by the dielectric layers 56 provide capacitance 36 therebetween. This capacitance 60 may be connected to a positive capacitance terminal 64 formed on layer 52 and a negative capacitance terminal 62 formed on layer 54.

The qualities of the dielectric of the insulating dielectric layer 56 will typically be at least as effective as polyethylene and will exhibit an electrical breakdown voltage in excess of 200 volts. The dielectric of the insulating dielectric layer 56 will be such as to increase that capacitance between the first conductive layer 52 and second conductive layer 54 by at least a factor of two compared to the use of an air dielectric.

The first and second conductive layers 52 and 54 may have a relatively high resistance as compared to the central main conductor, for example, being a silicon steel foil to provide the resistance 38 shown in FIG. 1. In some embodiments, this resistance of the steel foil may be augmented with additional distributed or discrete resistance placed in series with lead 74 described below.

This steel foil also provides a high relative permeability material that boosts the inductance of the central conductor 40 to provide inductance 34. Generally, the relative permeability of the wrappings 50 will provide an inductance of greater than 0.5 micro henries and will increase the inductance of the central conductor 40 by more than twice the inductance of the central conductor 40 without the wrappings 50. Generally, the layers 52 and 54 are positioned parallel to magnetic field lines 70 caused by conduction of electrical current from the first end 42 to the second end 44 along axis 46 thus reducing eddy current generation. Desirably the values of the capacitance 36 and inductance 34 will provide a low pass electrical filter operating having a corner frequency greater than 50 kilohertz.

Alternatively, or in addition to the relative permeability of the first and second conductive layers 52 and 54, the insulating dielectric layer 56 may incorporate particulate high relative permeability materials 57, for example, in granular form incorporated into the polymer of the dielectric layer 56 or the composition of the conductive material of layers 52 and 54 such as magnesium and zinc ferrite or nickel-zinc ferrite, exhibiting ferromagnetic or ferrimagnetic properties and high relative permeability, for example greater than 2, and preferably greater than 10. In this case, the conductive material of the first and second layers 52 and 54 need not be high relative permeability material but may be, for example, formed of other conductive materials including nonferrous materials or carbon.

The hysteresis loss in the conductive layers 52 also contribute to an effective resistance shunting the central conductor 40 such as also provides for damping. This shunting resistance may be augmented by a discrete resistor attached across opposite ends of the central conductor 40 if desired.

Referring now to FIG. 4, a series inductance of the capacitance 36 and its associated leads may be reduced by providing an effective "loop back" of current flow from capacitor terminal C+ near first end 42 to capacitor terminal C near second end 44 (within the wrappings 50) and then back, by means of loopback conductor 74 through the interior of the wrappings 50, toward first end 42 to exit from those wrappings 50 to be connected to ground.

Construction techniques for integrated capacitors and inductors are taught by co-pending application U.S. application Ser. No. 14/197,580 filed Mar. 5, 2014 (now issued as U.S. Pat. No. 9,424,984), and co-pending application Ser. No. 14/826,572 filed Aug. 14, 2015, both assigned to the assignee of the present invention and hereby incorporated by reference.

When multistranded copper is provided as a central conductor 40, it may be terminated with a copper ferrule providing the holes 41 and the first and second conductive layers 52 and 54 may be of a ductile material such as a soft iron or steel or elastic material such as a composite polymer conductor.

Referring now to FIG. 5, it will be appreciated that the resistance 38 (shown in FIG. 1) implemented by the wrappings 50 will generate heat that may be conducted into the material of the central conductor 40 through an electrically insulating but thermally conductive epoxy or the like forming a layer 80 on the inner side of the wrappings 50 and, for example, forming end caps 82 abutting the edges of the foil layers of the wrappings 50 at the first end 42 and second end 44. Selection of the insulating dielectric 56 may also be such as to promote thermal conduction. The conducted heat made be then carried into cabling 84 toward the motor 24 away from the heat sensitive elements of the power supply 12.

The central conductor 40 may be constructed to resist heat flow toward the second end 44, for example, by the inclusion of a void 88 or other thermally insulating stop resisting thermal flow out of end 44. In this regard, the end cap 82 at end 44 may be displaced inwardly from the void 88.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent hut arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

The terms "ground" and "ground point" should be generally understood to be either power supply ground or a floating or common neutral point (for example in a three-phase system) providing an electrical return for the filter of the present invention.

It will be understood that the term "rise rate" refers generally to rapid voltage fluctuations including those from a negative to positive direction and those from a positive to negative direction.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:
1. A bus conductor comprising:
an electrical conductor extending along a length between a first and second end; and
a wrapping spiraling around and radially outward from the length of the electrical conductor so as to expose the first and second ends of the electrical conductor for connection thereto, the wrapping being interleaved spirals of first and second layers of electrically conductive material separated by insulating material;

wherein the first layer of electrically conductive material is electrically attached to a first end of the electrical conductor and connected to the second end through an inductance of the electrical conductor promoted by the wrapping and the second layer of electrically conductive material is electrically attached to a ground lead electrically isolated from the central conductor and adapted to be connected to a ground.

2. The bus conductor of claim 1 wherein the ground lead attaches to the second layer of electrically conductive material and then passes through the wrapping toward the first end of the electrical conductor.

3. The bus conductor of claim 1 wherein the electrical conductor is a bar having a constant area cross-section measured in a cross-sectional plane cutting a line of extension between the first and second ends, and wherein the bar is constructed of a metal selected from the group consisting of copper and aluminum.

4. The bus conductor of claim 1 wherein the electrical conductor is a multi-stranded cable rated for currents in excess of ten amperes.

5. The bus conductor of claim 1 wherein the first and second conductive layers have a relative permeability of greater than 2.

6. The bus conductor of claim 1 wherein the first and second conductive layers are ferromagnetic foil.

7. The bus conductor of claim 1 wherein the first and second layers are formed of a combination of a electrically conductive material and a high relative permeability material.

8. The bus conductor of claim 1 further including a marking adapted to distinguish the first end from the second end.

9. The bus conductor of claim 1 wherein the ground lead is an insulated flexible wire that includes a terminating releasable connection to a ground point.

10. The bus conductor of claim 1 wherein the first and second ends include attachment holes passing therethrough.

11. The bus conductor of claim 1 including a protective cylindrical shroud fitting around the wrapping and being an insulating material.

12. The bus conductor of claim 1 wherein the electrical conductor and the wrapping provide an inductance of greater than 0.5 micro henries and wherein the first and second layers provide a capacitance of greater than 2 nano-farads.

13. The bus conductor of claim 1 the bus conductor provides a low pass electrical filter operating having a corner frequency greater than 50 kilohertz.

14. The bus conductor of claim 13 wherein a resistance of the first and second layers provides critical damping of the low pass electrical filter.

15. The bus conductor of claim 1 wherein the insulating layer provides an electrical breakdown voltage in excess of 200 volts.

16. The bus conductor of claim 1 wherein the first and second layer material operates to increase an inductance of the electrical conductor by a factor of no less than 2 when compared to the inductance of the electrical conductor without the first and second layer.

17. The bus conductor of claim 1 wherein the insulating material is a dielectric material increasing a capacitance between the first and second layer by at least a factor of two when compared to the capacitance where the first and second layers are separated only by air.

18. The bus conductor of claim 1 wherein the insulating material is a polymer material.

19. The bus conductor of claim 1 wherein the electrical conductor includes a thermal block reducing a flow of heat along the electrical conductor the thermal block positioned toward one end of the electrical conductor.

20. A motor drive system comprising:
a solid-state power supply;
a motor; and
at least one bus conductor passing between the solid-state power supply and the motor having:
an electrical conductor extending along a length between a first and second end; and
a wrapping spiraling around and radially outward from the length of the electrical conductor so as to expose the first and second ends of the electrical conductor for connection thereto, the wrapping being interleaved spirals of first and second layers of electrically conductive material separated by insulating material;
wherein the first layer of electrically conductive material is electrically attached to a first end of the electrical conductor and connected to the second end through an inductance of the electrical conductor promoted by the wrapping and the second layer of electrically conductive material is electrically attached to a ground lead electrically isolated from the central conductor and adapted to be connected to a ground.

* * * * *